US009965549B2

(12) United States Patent
Zent et al.

(10) Patent No.: US 9,965,549 B2
(45) Date of Patent: May 8, 2018

(54) EXCERPTED CONTENT

(71) Applicant: Foxwordy, Inc., San Carlos, CA (US)

(72) Inventors: Monica Zent, Sunnyvale, CA (US); Robert Schmitt, Santa Barbara, CA (US)

(73) Assignee: FOXWORDY INC., San Carlos, CA (US)

( * ) Notice: Subject to any disclaimer, the term of this patent is extended or adjusted under 35 U.S.C. 154(b) by 196 days.

(21) Appl. No.: 14/188,586

(22) Filed: Feb. 24, 2014

(65) Prior Publication Data

US 2015/0100570 A1   Apr. 9, 2015

Related U.S. Application Data

(60) Provisional application No. 61/906,400, filed on Nov. 19, 2013, provisional application No. 61/889,007, filed on Oct. 9, 2013.

(51) Int. Cl.
*G06F 17/30*   (2006.01)

(52) U.S. Cl.
CPC .............. *G06F 17/30675* (2013.01)

(58) Field of Classification Search
CPC ............. G06F 17/3053; G06F 17/30675
USPC .................................. 707/723, 722
See application file for complete search history.

(56) References Cited

U.S. PATENT DOCUMENTS

| 7,249,123 | B2* | 7/2007 | Elder | G06Q 10/10 |
| 7,716,198 | B2* | 5/2010 | Meyerzon | G06F 17/30684 707/706 |
| 8,055,688 | B2* | 11/2011 | Giblin | G06F 17/30817 707/702 |
| 8,126,912 | B2* | 2/2012 | King | G06F 17/30038 706/45 |
| 8,312,011 | B2* | 11/2012 | Olston | G06F 17/30864 707/723 |
| 8,589,392 | B2* | 11/2013 | Topatan | G06F 17/30011 707/732 |
| 8,626,823 | B2* | 1/2014 | Kumar | 707/721 |
| 8,843,856 | B2* | 9/2014 | Burns | G06F 17/30899 707/707 |
| 9,043,319 | B1* | 5/2015 | Burns | G06F 17/3064 707/706 |
| 9,129,029 | B1* | 9/2015 | Seth | G06F 17/30241 |
| 2005/0027670 | A1* | 2/2005 | Petropoulos | G06F 17/30867 |
| 2007/0100829 | A1* | 5/2007 | Allen | G06F 17/3089 |
| 2007/0174872 | A1* | 7/2007 | Jing | G06F 17/30244 725/46 |
| 2007/0198506 | A1* | 8/2007 | Attaran Rezaei | G06F 17/30675 |

(Continued)

*Primary Examiner* — Miranda Le
(74) *Attorney, Agent, or Firm* — Fenwick & West LLP

(57) ABSTRACT

Content uploaded by users of a computing system is found through a search. The method search receives a search term, retrieves content, identifies instances of the search term in the retrieved content, scores the retrieved content, ranks the scored content, and selects content from the ranked content. The uploaded content is created by a method where received text files are processed to remove formatting, tags, and non-printing characters. Uploaded content may be further associated with attributes used to narrow searches for content. The processed content is searched and may also be used as a source for excerpts for summarizing, representing, or otherwise embodying the content.

15 Claims, 9 Drawing Sheets

(56) References Cited

U.S. PATENT DOCUMENTS

| | | | |
|---|---|---|---|
| 2008/0320397 A1* | 12/2008 | Do | G06F 17/30126 715/751 |
| 2009/0063990 A1* | 3/2009 | Morris | G06F 17/30864 715/751 |
| 2009/0089372 A1* | 4/2009 | Sacco | G06F 17/3089 709/204 |
| 2009/0106221 A1* | 4/2009 | Meyerzon | G06F 17/30864 |
| 2009/0106235 A1* | 4/2009 | Tankovich | G06F 17/30864 |
| 2009/0119258 A1* | 5/2009 | Petty | G06Q 30/02 |
| 2010/0023405 A1* | 1/2010 | Liu | G06Q 30/0269 705/14.66 |
| 2010/0070486 A1* | 3/2010 | Punaganti Venkata | G06F 17/30893 707/722 |
| 2010/0146593 A1* | 6/2010 | Stahl | G06F 21/604 726/4 |
| 2011/0060751 A1* | 3/2011 | English | G06F 17/30746 707/758 |
| 2011/0093520 A1* | 4/2011 | Doyle | G06F 17/30867 709/203 |
| 2011/0264694 A1* | 10/2011 | Rensburg | G06F 17/241 707/770 |
| 2011/0276396 A1* | 11/2011 | Rathod | G06F 17/30867 705/14.49 |
| 2012/0124073 A1* | 5/2012 | Gross | G06F 17/30873 707/767 |
| 2012/0210247 A1* | 8/2012 | Khouri | G06Q 10/101 715/751 |
| 2013/0014023 A1* | 1/2013 | Lee | G06Q 10/103 715/751 |
| 2013/0014209 A1* | 1/2013 | Chastagnol | G06Q 10/06 726/1 |
| 2013/0080919 A1* | 3/2013 | Kiang | H04L 67/327 715/753 |
| 2013/0124638 A1* | 5/2013 | Barreto | G06F 15/16 709/205 |
| 2013/0198600 A1* | 8/2013 | Lockhart | G06F 17/241 715/230 |
| 2013/0275413 A1* | 10/2013 | Snir | G06F 17/30554 707/722 |
| 2014/0025662 A1* | 1/2014 | Kim | G06F 17/30864 707/722 |
| 2014/0129636 A1* | 5/2014 | Lee | H04W 4/18 709/204 |
| 2014/0207529 A1* | 7/2014 | Rajasingham | G06Q 10/101 705/7.38 |

* cited by examiner

400

| User ID 402 | Content Title 404 | Content Text 406 | Time Created 408 | Time Stored 410 | Time Updated 412 | Time Deleted 414 | Content State 416 | Content Key 418 | Content Type 420 | Content Metadata 422 | File Size 424 |
|---|---|---|---|---|---|---|---|---|---|---|---|

| Content Key 502 | User ID 504 | Interest ID 506 | Time Created 508 |
|---|---|---|---|

| Content Key 602 | Content Attribute ID 604 | Time Created 606 |
|---|---|---|

EXCERPTED CONTENT

CROSS REFERENCE TO RELATED APPLICATIONS

This application claims the benefit of U.S. Provisional Application No. 61/906,400, filed Nov. 19, 2013 and U.S. Provisional Application No. 61/889,007, filed Oct. 9, 2013, which are incorporated by reference in their entirety.

BACKGROUND

1. Field of Art

The disclosure generally relates to the field of social networking, and more particularly to sharing documents among users of a social network computing system.

2. Description of the Related Art

Professionals seeking to share and collaborate on documents are generally limited to in-person interactions with known colleagues. Although document repositories are publicly available online, these may be unreliable due to anonymity of the poster and lack of metrics indicating how useful, factual, or accurate a document is. Other documents posted may be from a well-regarded source, but the number of such articles having publishable quality is limited. Published articles deal with the common and general cases, not with specific cases that may occur infrequently. Additionally, these document repositories are not efficiently searchable for a document or clause used for a specific situation, in part due to lack of categorization. While help for a particular situation could be obtained in-person with a colleague, the number of colleagues accessible for consultation on a matter may be inadequate. Although some online websites enable document collaboration, specific clauses may be difficult to find due to lack of categorization.

BRIEF DESCRIPTION OF DRAWINGS

The disclosed embodiments have other advantages and features, which will be more readily apparent from the detailed description, the appended claims, and the accompanying figures (or drawings). A brief introduction of the figures is below.

FIG. 4 illustrates an entry in a content store in one embodiment.

FIG. 5 illustrates an entry in a linked interest store in one embodiment.

FIG. 6 illustrates an entry in a content attribute store in one embodiment.

FIG. 12 illustrates an example user interface for viewing and managing excerpted content uploaded by a user.

DETAILED DESCRIPTION

The Figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Disclosed is a system (and method and computer-readable storage medium) for searching through textual content uploaded by users of a computing system. The computing system may contain a network server connected by a network to client devices. The network server responds to requests by the client devices. Users of the client devices have user profiles, which are organized into default networks based on common attributes shared by user profiles. Users may also upload excerpted content items containing text to the computing system, which processes uploaded excerpted content to remove formatting, tags, and non-printing characters. Through an uploading interface, an uploading user may attach attributes to the excerpted content.

Once processed, excerpted content is viewed by users of the computing system through user profiles that are connected to the uploading user profile, user profiles that are in the same default network as the uploading user profile, or all user profiles. Excerpted content visible to a user profile may be found using a search interface, which retrieves excerpted content and identifies occurrences of the search term. Retrieved documents are scored based on identified occurrences of the search term and ranked. The ranked documents are returned to the search interface, where they may be further filtered according to desired attributes of the excerpted content. Common search terms are indexed and stored along with the top results for the search terms for retrieval when a user makes a search through the user interface.

Computing Machine Architecture

Figure 1:
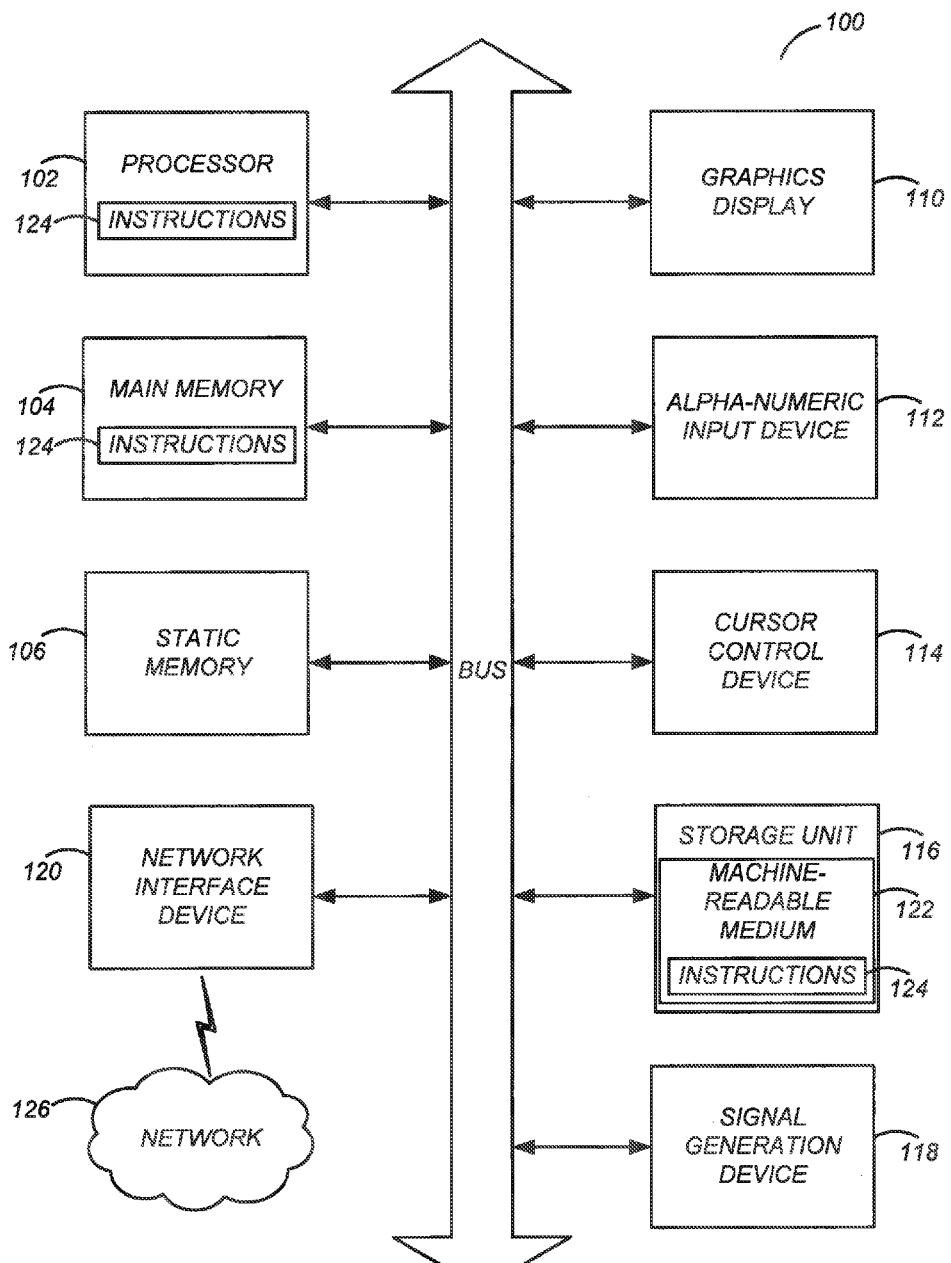
FIG. 1 illustrates one embodiment of components of an example machine able to read instructions from a machine-readable medium and execute them in a processor (or controller).

FIG. 1 is a block diagram illustrating components of an example machine able to read instructions from a machine-readable medium and execute them in a processor (or controller). Specifically, FIG. 1 shows a diagrammatic representation of a machine in the example form of a computer system 100 within which instructions 124 (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 124 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 100 includes a processor 102 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 104, and a static memory 106, which are configured to communicate with each other via a bus 108. The computer system 100 may further include graphics display unit 110 (e.g., a plasma display panel (PDP), a liquid crystal display (LCD), a projector, or a cathode ray tube (CRT)). The computer system 100 may also include alphanumeric input device 112 (e.g., a keyboard), a cursor control device 114 (e.g., a mouse, a trackball, a joystick, a motion sensor, or other pointing instrument), a storage unit 116, a signal generation device 118 (e.g., a speaker), and a network interface device 120, which also are configured to communicate via the bus 108.

The storage unit 116 includes a machine-readable medium 122 on which is stored instructions 124 (e.g., software) embodying any one or more of the methodologies or functions described herein. The instructions 124 (e.g., software) may also reside, completely or at least partially, within the main memory 104 or within the processor 102 (e.g., within a processor's cache memory) during execution thereof by the computer system 100, the main memory 104 and the processor 102 also constituting machine-readable media. The instructions 124 (e.g., software) may be transmitted or received over a network 126 (e.g., WiFi, 3G, 4G, Ethernet, digital subscriber line (DSL), fiber optic network) via the network interface device 120.

While machine-readable medium 122 is shown in an example embodiment to be a single medium, the term "machine-readable medium" should be taken to include a single medium or multiple media (e.g., a centralized or distributed database, or associated caches and servers) able to store instructions (e.g., instructions 124). The term "machine-readable medium" shall also be taken to include any medium that is capable of storing instructions (e.g., instructions 124) for execution by the machine and that cause the machine to perform any one or more of the methodologies disclosed herein. The term "machine-readable medium" includes, but not be limited to, data repositories in the form of solid-state memories, optical media, and magnetic media.

Example Architectural Configuration

Figure 2:
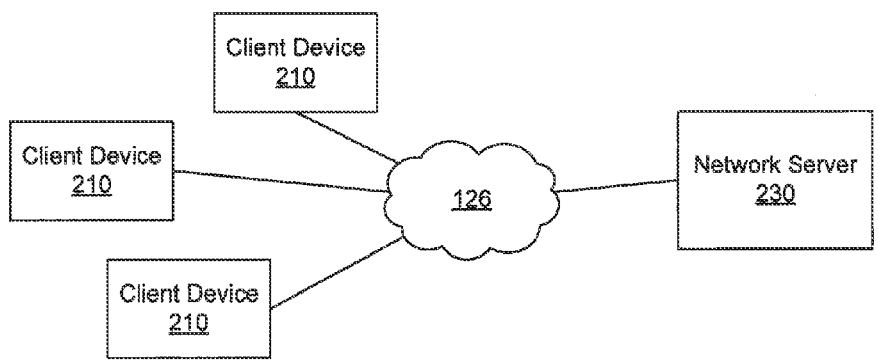
FIG. 2 illustrates an architectural configuration used to implement one example embodiment of a default network computing system.

Referring now to FIG. 2, illustrated is a block diagram of a default network environment 200 in an example embodiment. The default network environment 200 includes one or more client device 210 (e.g., a personal computer, a tablet, a smartphone, a cellular phone, a terminal, a smart television, a personal digital assistant (PDA), a smart watch, a wearable computer), a network 126, and a network server 230. A computer system 100 may be used in some embodiments of the client device 210 and/or network server 230. The one or more client devices 210 are coupled to the network 126, which is in turn coupled to the network server 230. In an alternate embodiment, additional networks 126, client devices 210, and/or network servers 230 may be present. For example, an additional network server 230 may act as a proxy server between the one or more client devices 210 and another network server 230.

The one or more client devices 210 may be used by users to view, upload, and submit, and interact with content in the default network computing system. For example, a user may provide a numerical rating of content uploaded by another user. Users of the one or more client devices 210 may create user profiles and may connect their user profiles on the default network to other user profiles on the default network. Users of the one or more client devices 210 may declare or modify preferences governing their user profile and/or content they upload. For example, a user profile may limit who may view content uploaded through the user profile. In an example embodiment, Hypertext Markup Language (HTML) code is used to display content on the client device 210. Alternate embodiments may use other data-interchange formats such as Extensible Markup Language (XML) or JavaScript Object Notation (JSON). A client device 210 may be associated with a single user profile, or the client device 210 may be associated with multiple user profiles. In an embodiment, a user may access their user profile through multiple client devices 210.

In one embodiment, the network server 230 stores data about the default network including user profiles, content, and connections between users. The network server 230 may retrieve and/or process data as requested by users of client devices 210. In an example embodiment, HyperText Transfer Protocol (HTTP) may be used to exchange or transfer data between a network server 230 and a client device 210 using HTTP methods including GET, POST, PUT, and DELETE. In an alternate embodiment, some or all of the processing and/or storing functions of the network server 230 may be performed by one or more client devices 210 alone or in combination with a network server 230. In an alternate embodiment, a single device may implement components of a client device 210 and a network server 230.

Figure 3:
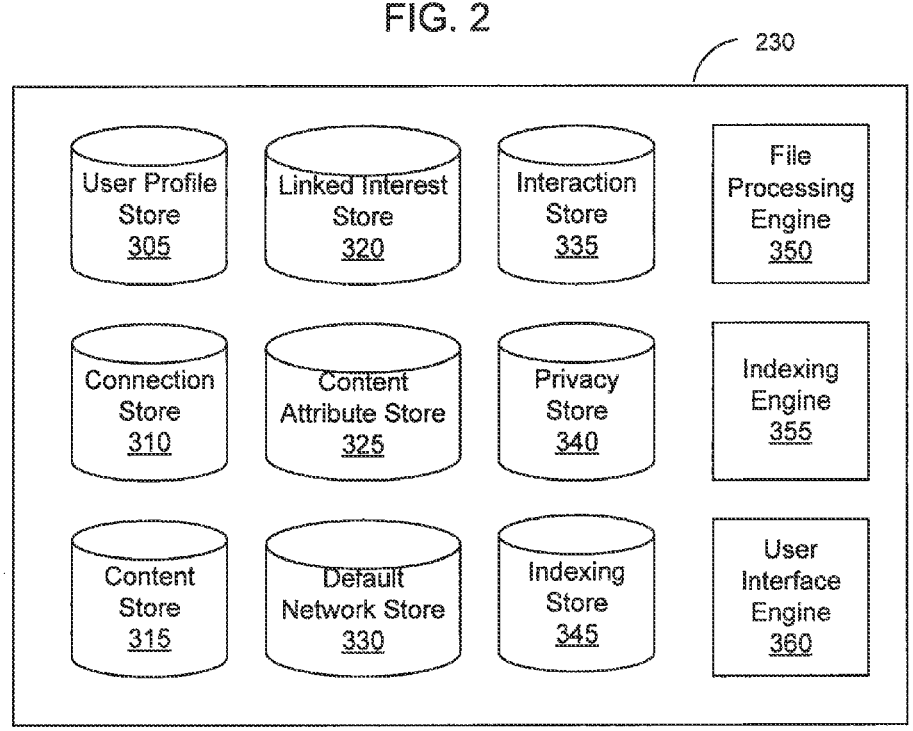
FIG. 3 illustrates a block diagram of a network server used to implement excerpted content sharing in one embodiment.

Referring now to FIG. 3, illustrated is a block diagram of a network server 230 used to implement the default network in one embodiment. The network server 230 contains a user profile store 305, a connection store 310, a content store 315, a linked interest store 320, a content attribute store 325, a default network store 330, an interaction store 335, a privacy store 340, a file processing engine 350, an indexing engine 355, and a user interface engine 360. The user profile store 305 contains information that a user has provided (e.g., a user profile created by a user). Example information in a user profile entry of the user profile store 305 may include a unique user identification (ID), first name, last name, location, company, title, account type, expertise, and practice area. Other information in a user profile may include previous work history, education, honors, awards, associations, languages, certifications, a profile picture uploaded by the user, and a written biographical summary or statement of purpose submitted by the user.

The connection store 310 stores one or more connections made between users using their user profiles. In an embodiment, the connections are stored as connection entries between a user profile and another user profile. User profiles that are connected may be granted additional access to each other's user profiles or content that has been uploaded. Connections may be used to create an individualized activity feed for a user profile that summarizes recent actions taken by connections and other relevant user profiles. An example activity feed may include recently uploaded excerpted content items, recent comments on excerpted content items, requests, referrals, or questions. Connections may be additionally be used to suggest new connections (e.g., based on connections in common). Connections of a user profile may have additional opportunities for interaction with the user profile such as suggesting new connections, sending messages, requests, referrals, content items, or questions, for example.

The content store 315 stores excerpted content items uploaded by user profiles to the default network computing system. In one embodiment, excerpted content is stored as text or as a text file, but other embodiments may contain content including images, videos, and/or audio files. Excerpted content items in the content store 315 are created by the file processing engine 350 and are accessed by the indexing engine 355 for performing searches. Excerpted content items may be displayed by the user interface engine 360. In an embodiment, excerpted content items may be uploaded as a "Clause" or a "Document." In one embodiment, Clauses are text-entered into the default network user interface, and Documents are files uploaded through the default network user interface. Content may be transferred to/from the content store 315 from/to a client device 210 or from a cloud storage service (e.g., DROPBOX, GOOGLE DRIVE, or BOX).

The linked interest store 320 indicates user profiles that have expressed interest in an excerpted content item. A linked interest store entry may be created when a user profile interacts with an excerpted content item through the user interface engine 360. For example, when a user profile views, downloads, likes, favorites, or comments on an excerpted content item, an entry in the linked interest store 320 may be created linking the user profile with the excerpted content item. Other example actions that may prompt creation of a linked interest store 320 may include attaching an excerpted content item to a question, request, resource, or message. In an alternate embodiment, the linked interest store 320 may be used to suggest excerpted content items to a particular user profile based on excerpted content items with which the particular user profile's connections have interacted.

The content attribute store 325 indicates attributes associated with an excerpted content item. An entry in the content attribute store 325 may be created when a user profile uploads an excerpted content item through the user interface engine 360. Attributes associated with an excerpted content item may include, for example, document type, author name, author perspective, author practice area, author location, author expertise, author occupation, author industry, author sub-industry, author employer, and author account type. Attributes associated with an excerpted content item in the content attribute store 325 may, for example, be used by the indexing engine 355 to search for excerpted content items having one or more particular attributes.

The default network store 330 stores data relating to a default network. A user profile is associated with a default network based on one or more attributes the user profile shares with other user profiles in the default network. An example entry in the default network store 330 may include a unique identifier for the default network, user profiles associated with the default network, and common attributes of those user profiles associated with the default network. In an alternate embodiment, a user profile may be placed in one or more default networks according to one or more attributes chosen by a user. For example, a user profile may be placed in the same default network as other user profiles having the same account type, general location, and practice area. The default network may be used to suggest additional connections for a user profile (e.g., other users in the user's default network). Membership in a default network by a user profile may grant that user profile access to user profiles in the default network as well as excerpted content items uploaded through user profiles in the default network. In an embodiment, the default network may be used to generate an activity feed listing activity such as excerpted content uploads and interactions between user profiles or with an excerpted content item.

The interaction store 335 records of interactions between user profiles. For example, the interaction store may 335 record when a user profile begins following another user profile, states interest in another user profile, states another user profile as a favorite, shares excerpted content with another user profile, comments on excerpted content, rates excerpted content, up votes or likes excerpted content, makes or fulfills a request, asks or answers a question, requests or makes a referral, searches for content, searches for a user, or views content. Entries in the interaction store 335 may, for example, include fields identifying the interaction type, an interaction identification (ID), a user ID of the user profile who initiated the interaction, a user ID of a user profile at which an interaction is directed, a time the interaction occurred, a time the interaction was updated, an interaction ID corresponding to another interaction responsive to the interaction, a message included in the interaction, and other fields relevant to the particular interaction. The interaction store 335 may be accessed by the user interface engine 360 to generate user interaction histories or to suggest connections or excerpted content to a user profile.

The privacy store 340 stores user preferences regarding privacy of user profile information, user interactions, and content items uploaded by a user. Privacy preferences stored may determine access to a user profile, user interaction, or excerpted content item. User profiles with sufficient permission may access requested information. Other privacy preferences control how a user profile appears to other user profiles. For example, a user profile can choose full anonymity, no anonymity, or partial anonymity (e.g., no name displayed, but job title and practice area displayed). Privacy settings may make a user profile, user interaction, or excerpted content item fully public, fully private, or available to certain user profiles (e.g., user profiles with which a user profile is connected, user profiles in the same default network). Settings in the privacy store 340 may be checked by the indexing engine 355 or user interface engine 360. The privacy store 340 may be updated when a user uploads excerpted content through the file processing engine 350 or through privacy settings interfaces generated by the user interface engine 360.

The indexing store 345 tracks occurrences of search terms in uploaded excerpted content items. The indexing engine 355 may index excerpted content items in the content store 315. Indexing excerpted content items includes counting occurrences of a search term and scoring a document's relevance to the search term based on where the one or more occurrences of the search term were found in the excerpted content item. Search terms may include a letter, a word, or a phrase. Some words may be excluded from searching (e.g., articles, conjunctions, prepositions, obscenities, derogatory terms). Indexing may occur in response to uploading or modifying an excerpted content item and/or may occur periodically. Results of indexing may be stored in the indexing store 345 as entries by search term indicating occurrences of the search term and a score with respect to the search term in excerpted content items. In an alternate embodiment, entries in the indexing store 345 may be organized by excerpted content item instead of by search term.

The file processing engine 350, which may be configured with elements similar to the computer system 100, processes excerpted content uploaded through the user interface engine 360 and manages excerpted content that has been uploaded. The file processing engine receives a file and removes non-textual information such as formatting tags, control codes, and embedded images, audio, and/or video. The uploaded excerpted content item is stowed in the content store 315, and any attribute tags specified by the user uploading the file are stowed in the content attribute store 325. After verifying that the text has been successfully uploaded, the file processing engine 340 publishes the uploaded excerpted content item, which makes the excerpted content item available for display by the user interface engine 360, provided that privacy settings in the privacy store 340 are satisfied. The file processing engine 350 may receive text directly entered into a user interface or a file uploaded through the user interface. Example files processed by the user interface my include Microsoft Word® files such as .doc and .docx as well as Rich Text Format (.rtf) and plaintext format (.txt).

The indexing engine 355, which may be configured with elements similar to the computer system 100, receives a search term 810 and identifies instances of the search term in excerpted content in the content store 315. In an embodiment, excerpted content items are scored based on the identified instances of the search term (e.g., by number of instances of the search term) and ranked by score. Results of indexing may be stored in the indexing store 345. One or more of the ranked excerpted content items may be displayed for a user who provided the search term, in an embodiment. In an embodiment, the indexing engine 355 searches excerpted content items for common search terms (e.g., the most common words excluding articles, prepositions, and conjunctions) and stores indexing results periodically, when an excerpted content item is published, when an excerpted content item is modified or some combination thereof.

The user interface engine 360, which may be configured with elements similar to the computer system 100, creates interfaces to provide for display on a client device 210. Example interfaces may structured to display a user profile, connections of a user, pending connections, potential connections, one or more connections in a default network, excerpted content submitted by a user, interactions between one user and another user, and/or aggregations of user interactions. Example interfaces may be structured to display data passively and/or accept input from the user of a client device 210. The user interface engine 360 may retrieve, store, and/or modify data from the user profile store 305, the connection store 310, the content store 315, the linked interest store 320, the content attribute store 325, the default network store 330, the interaction store 335, and/or the privacy store 340. The user interface engine 360 may provide data and/or inputs to the file processing engine 350 and indexing engine 355.

The network server 230 may contain additional modules, engines, or stores. For example, the network server may include a file store to store the original files for uploaded documents. The network server may include a connection invitations store to track pending connection invitations. As another example, the network server 230 may contain a content misuse table. Excerpted content may be flagged as inappropriate, plagiarized, stolen, confidential, or privileged by a viewing user. A content misuse table might contain a user ID of the user who flagged the content, a content ID or content key identifying the content, a timestamp, and text indicating why the content was flagged as misused. The content may be later reviewed by an administrator for deletion of that content. The network server 230 may contain additional engines, such as an engine to handle connection requests, an engine to create and modify default networks in the default network store 330, or an engine to rank user profiles by a quantification of user reputation.

Excerpted Content Data

Referring now to FIGS. 4 through 6, illustrated are entries to track data about excerpted content items. In one embodiment, data stores (e.g., 305, 310, 315, 320, 325, 330, 335, 340) are implemented in a Relational Database Management System (RDBMS) implemented in a programming language such as Structured Query Language (SQL), PostgreSQL, MySQL, SQL Server, or Oracle. An example content store entry 400 implements the content store 315. The example content store entry contains all or a subset of a user identification (ID) field 402, a content title field 404, a content text field 406, a time created field 408, a time stored field 410, a time updated field 412, a time deleted field 414, a content state field 416, a content key field 418, a content type field 420, a content metadata field 422, and a file size field 424. The user ID field 402 indicates the user who uploaded the excerpted content. The content title field 404 indicates a text title input by the user. The content text field 406 contains the excerpted content text, which in an embodiment has been scrubbed by the file processing engine 350 to remove formatting, control codes, and non-text content. In an embodiment, the content text field 406 contains text that has been uploaded but has not been modified by the file processing engine 350. The time created field 408 indicates when the content store entry 400 was created. The time stored field 410 indicates when the content store entry 400 was stored in the content store 315. In an alternate embodiment, time stored field 410 may indicate when the content text field 406 was filled. The time updated field 412 indicates when the content store entry 400 was last modified. The time deleted field indicates when the content store entry 400 was deleted. In an embodiment, a user can delete an excerpted content item from access by the user interface, but the corresponding content store entry 400 may remain available for recovery. In an alternate embodiment, deleting an excerpted content item deletes the content title 404 and/or content text 406 while retaining other fields in the content store entry 400.

The content state entry 416 indicates the current state of the excerpted content item. Example states include empty (e.g., the content store entry 400 has been created but remains unfilled with data), uploaded (e.g., text or a file has been uploaded to the content store entry 400), processed (e.g., text has been processed by the file processing engine 350 and stored in the content text field 406), verified (e.g., the necessary fields of the content store entry 400 contain valid data), published (e.g., the excerpted content contained in the content store entry 400 is available through the user interface), corrupted (e.g., the content store entry 400 has been marked for review due to data verification failure, for example), and cleared (e.g., one or more fields of the content store entry 400 have been deliberately deleted). The content key field 418 is a unique content identifier generated based on the processed text and used to compare excerpted content items. In one example embodiment, the text in the content text field 406 is used as an input to a hashing algorithm to generate a unique key placed in the content key field 418. Secure Hash Algorithm 1 (SHA-1) is a hashing algorithm used in one embodiment. Identical content text fields 406 may be detected based on a match between content key fields 418.

The content type field 420 may indicate whether excerpted content was added to the default network computing system as a Clause or a Document. If the excerpted content is a Document, the content type field 420 may further indicate the original file type (e.g., file extensions such as .doc, .docx, .cwk, .pages, .rtf, .txt). The metadata field 422 may include data about an uploaded Document file including the file author, the file title, the file size, the date created, the date last updated, the file type, and file tags. The file size field 424 indicates the size of the processed content text 406. A content store entry 400 may contain further fields listing a description, preview, or notes on the excerpted content. Other additional fields may include time of publication. In an alternate embodiment, a separate content identification (ID) may be included in a content store entry 400.

An example linked interest entry 500 implements the linked interest store 320 and includes all or a subset of a content key field 502, a user ID field 504, an interest ID field 506, and a time created field 508. A linked interest entry 500 may be created in the linked interest store 320 when a user profile interacts with an excerpted content item through the user interface engine 360. The content key field 502 indicates which excerpted content item the linked interest entry 500 refers to and matches the content key field 402 in the corresponding content store entry 400. In an alternate embodiment, a separate content identification (ID) may be used in place of the content key field 502. The user identification field (ID) 504 refers to the user profile that interacted with the excerpted content item referred to by the content key field 502. The interest identification (ID) field 506 refers to the particular interest type shown (e.g., viewing, downloading, liking, marking as a favorite, rating, commenting on the excerpted content item or attaching the excerpted content item to a question, request, resource, or message). The time created field 508 indicates when the linked interest entry 500 was created. A content item may be associated with one or more linked interest entries, and a user may be associated with one or more linked interest entries. In an alternate embodiment, the linked interest entry 500 may contain additional information about one or more interactions between a user and an excerpted content item. A linked interest entry 500 may be used to suggest an excerpted content item in a user activity feed or elsewhere in the default network user interface.

An example content attribute entry 600 implements the content attribute store 325 and includes all or a subset of a content key field 602, a content attribute ID field 604, and a time created field 606. A content attribute entry 600 is created based on attributes a user indicates when the user uploads an excerpted content item. The content key field 602 indicates which content item the content attribute entry 600 refers to and matches the content key field 402 in the corresponding content store entry 400. In an alternate embodiment, a separate content identification (ID) may be used in place of the content key field 602. The content attribute identification (ID) refers to the attribute associated with the excerpted content item referred to by the content key field 602. Example attributes associated with a content item may include document type, author name, author perspective, author practice area, author location, author expertise, author occupation, author industry, author sub-industry, author employer, or author account type. The time created field 606 indicates when the linked interest entry 500 was created. An excerpted content item may be associated with one or more content attribute entries 600. In an embodiment, a content attribute entry 600 is used to filter search results for the indexing engine 355. A content attribute entry 600 may be used to suggest an excerpted content item in a user activity feed or elsewhere in the default network, for example, through the default network user interface.

Creating Excerpted Content

Figure 7:
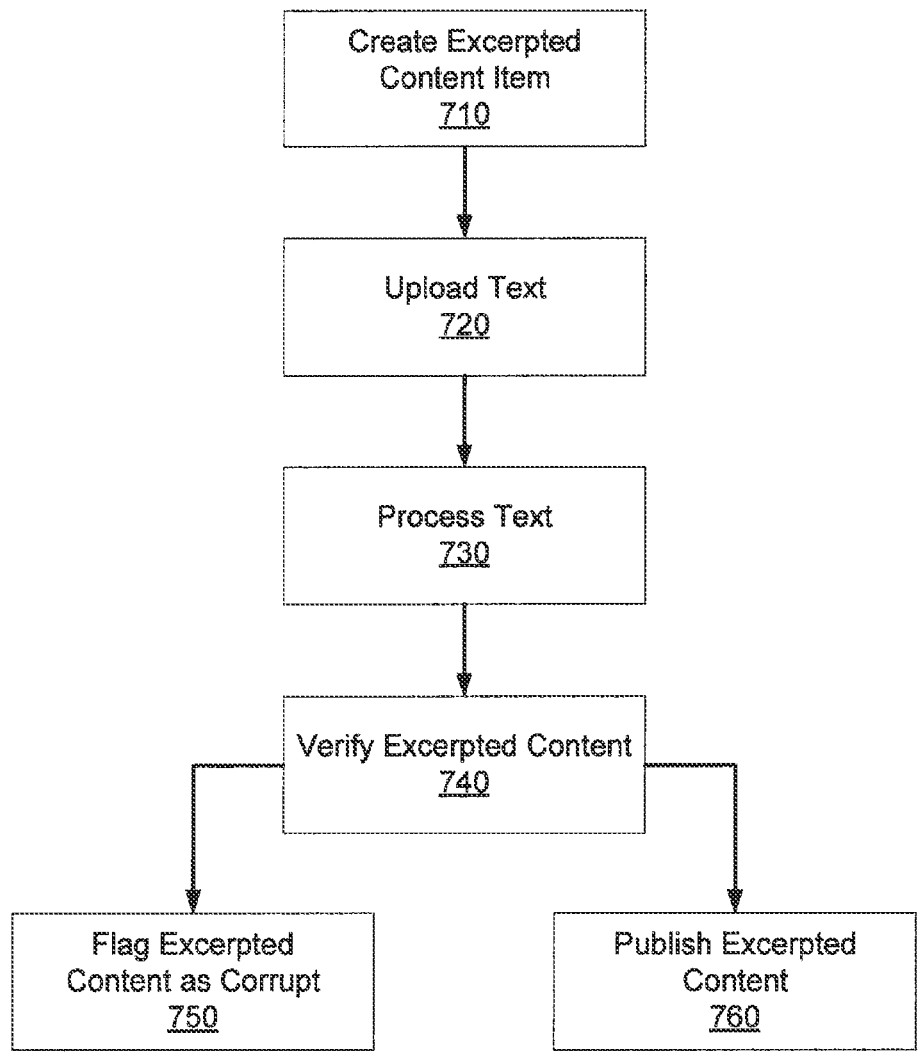
FIG. 7 illustrates a flow chart of an example process for uploading and publishing excerpted content.

Referring now to FIG. 7, illustrated is an example process for uploading and publishing excerpted content. In an example excerpted content creation process 700, an excerpted content item is created 710, text is uploaded 720, the uploaded text is processed 730, the excerpted content is verified 740, and depending on the result of the excerpted content verification, the excerpted content item is flagged 750 as corrupt or published 760. In an embodiment, the excerpted content creation process 700 may be implemented by the file processing engine 350 alone or in combination with the user interface engine 360. To create 710 an excerpted content item, a content store entry 400 is created and the time created field 408 is filled with the time of creation. The content state field 416 may indicate that the content state is empty. In an alternate embodiment, a content store entry 400 may be created without user input or may be created in response to receiving an input from an Application Programming Interface (API).

Text is uploaded 720 through the user interface engine 360. In one embodiment, a user may enter text directly into the user interface engine, (i.e., a clause (or Clause)) or may upload an electronic file containing text (i.e., a document (or Document)). In an alternate embodiment, text may be received from an API. The title supplied with the uploaded text is placed in the content title field 404. The content state field 416 may be updated to uploaded, and the content type field 420 may indicate whether a Clause or Document was uploaded and/or what file type was uploaded 720. If a file was uploaded 720, then any file metadata (e.g., file author, file title, file size, date created, date last updated, file type, file tags) may be stored in the metadata field 422. The file size of the content text field 406 may be indicated by the file size field 424. In one embodiment, one or more attributes specified by a user are stored in one more content attribute entries 600. For example, if an uploaded file is specified to apply to the practice area of corporate law, then a content attribute ID corresponding to corporate law will be stored in the content attribute ID field 604, and the time created field 606 may indicate when the content-attribute entry 600 was created. In an alternate embodiment, an excerpted content item associated with multiple attributes may have multiple content attribute IDs stored in the content attribute ID field 604. In an embodiment, privacy settings are specified and these privacy settings are stored in the privacy store 340 when an excerpted content item is uploaded 720. In an alternate embodiment, when a Document is uploaded, the original file may be retained in the content store 315 or a separate store on the network server 230.

The uploaded text is next processed 730. Processing removes data from the text file including formatting, tags, non-printing characters, control codes, and embedded images, audio, and/or video. Example characters removed may include carriage returns, line breaks, line feeds, backspace, tabs, vertical tabs, non-breaking spaces, space meta-characters, vertical tabs, form feed characters, escape characters, delete characters, and other non-printing characters. Other example data removed from the text may include data specifying formatting (e.g., bold, italics, underline, subscript, superscript, strikethrough, indents, font, size, line spacing, and other styles). After the text is processed 730, the text is stored in the content text field 406 and the content state field 416 is marked as processed. In an embodiment, the time stored field 410 is updated after the text is processed 730, and the time updated field 412 is updated as well. The text stored in the content text field 406 may be input to SHA-1 to generate a content key from the content text. The generated content key may be stored in the content key field 418. In an alternate embodiment, other hash algorithms such as SHA-2 may be used.

Once the text has processed 730 and all fields have been updated, the excerpted content item is verified 740. A content store entry 400 passes verification if its fields are filled as expected. In an embodiment, some fields such as the time deleted field 414 may be optional to pass verification. In an alternate embodiment, verification is performed manually by an administrator of the social networking system, who indicates if an excerpted content item is ready for publication or is corrupted. If a content store entry 400 does not pass verification, the excerpted content item is flagged 750 as corrupt. Excerpted content items flagged 750 as corrupt may be reviewed by an administrator to determine the cause of failed verification. The content state field 416 for the excerpted content item may be marked as corrupt. A corrupted excerpted content item may be removed or deleted. Removal or deletion may fully delete the associated content store entry 400 and all other data store entries associated with the content item, or partial deletion may occur. The content state field 416 may be marked as deleted to prevent processes from accessing the excerpted content item without removing the data from storage. If a content store entry 400 passes verification, then the excerpted content item is published 760. A published excerpted content item may be accessed through the user interface (or through an API in an alternate embodiment) after the excerpted content item is published 740. Examples of accessing excerpted content include through a link on a user profile page, a user activity feed, or a search result page. The time at which an excerpted content item is published may be recorded in a time published field in the corresponding content store entry 400.

Searching Excerpted Content

Figure 8:
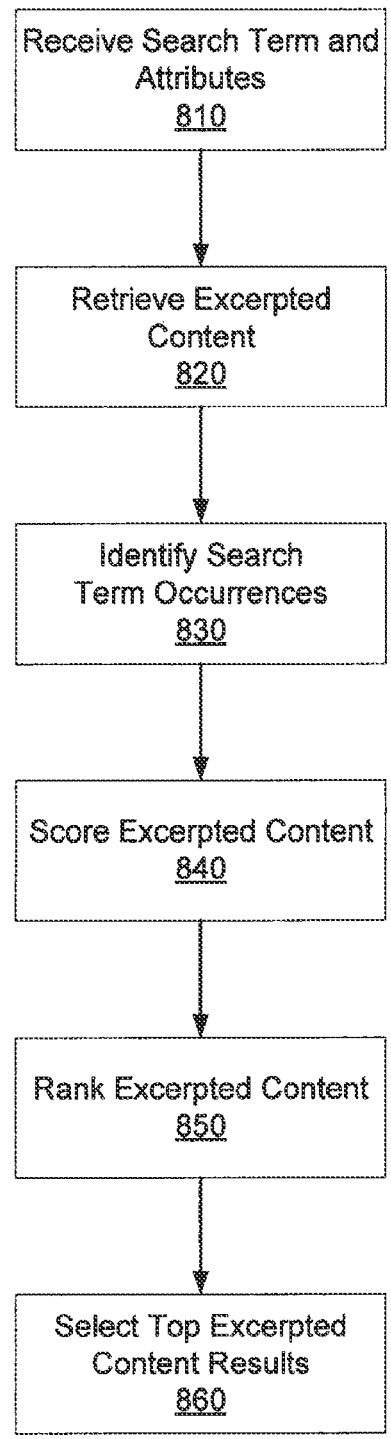
FIG. 8 illustrates a flow chart of an example process for searching for excerpted content uploaded by users.

Referring now to FIG. 8, illustrated is an example process for searching for excerpted content uploaded by users. In an example excerpted content search process 800, a search term and one or more attributes are received 810, excerpted content items are retrieved 820, search term occurrences are identified 830, excerpted content items are scored 840, excerpted content items are ranked 850, and top search results are selected 860. The content search process 800 may be carried out by the indexing engine 355, the user interface engine 360, or a combination of the two. In one embodiment, the search term and one or more attributes are received 810 through the default network user interface or may be received from an API associated with the default network computing system. In an embodiment, the search term may be generated by a regularly occurring process or a process in response to publication of an excerpted content item. In an embodiment, the search term received may include one or more words or phrases. The received attributes may include all or a subset of document type, author name, author perspective, practice area, author location, author expertise, author occupation, author employer, and author account type.

In response to receiving 810 a search term, one or more excerpted content items are retrieved 820 from the content store 315. Excerpted content items having the one or more received attributes, as recorded in content attribute entries in the content attribute store 325, are retrieved 820. For example, suppose a user specifies a search for excerpted content in consumer law and having the Clause document type. In the example, excerpted content having associated attribute entries indicating a document type of Clause and a practice area of consumer law are retrieved. In an embodiment, excerpted content items may be retrieved regardless of attribute to update the indexing store 345.

The search term occurrences are identified 830 in the excerpted content. In one embodiment, the occurrences of the search term are identified in the content title field 404, content text field 406, content description, and/or content notes. In an alternate embodiment, occurrences of the search term may be identified 830 in comments on an excerpted content item. In an embodiment, a search term may specify grouping of words into a phrase, and occurrences of the words in the phrase are identified 830 if the words are arranged as they are specified in the search term phrase. In an embodiment, occurrences of the attributes specified for the search are identified 830 among the attributes associated with an excerpted content item in the content attribute store 325. In an embodiment, occurrences of search terms within an excerpted content item are stored in the indexing store 345.

The retrieved excerpted content items are scored 840 based in part on the identified search term occurrences. In an embodiment, one or more identified occurrences of a search term are multiplied by a weight based on which field (e.g., text, title, description, notes) of the excerpted content item contained the one or more occurrences (if any) of the search term. For example, an occurrence of a search term in the title of an excerpted content item may have a greater weight than an occurrence of a search term in the text of an excerpted content item. In an embodiment, an excerpted content item is scored 840 as the sum of the products of the search term occurrences multiplied by the weights corresponding to fields in which the occurrences were identified. In an embodiment, the excerpted content item score calculated from the weighted sum is modified according to a number of attributes identified 830 that match the attributes specified in the search. In an alternate embodiment, a score for an excerpted content item may be modified according to comments, likes, ratings, or favorites received by that excerpted content item. In an embodiment, a score for an excerpted content item with respect to a search term may be stored in the indexing store 345.

After the retrieved excerpted content items are scored 840, they are ranked 850 according to the scores given. The top excerpted content items are selected 860 from the ranking and are stored for later retrieval for display to a user. In an embodiment, the results may be provided for display to a user or may be provided through an API to fulfill a request. The number of content items may be specified by the requesting user or may be preset. The provided search results may include an excerpt from the excerpted content. For example, the excerpt may include text containing the first instance of the search term or text including the most occurrences of the search term. It is noted that the disclosed embodiments describe creating and searching excerpted content in the context of a default network for example purposes only. Alternate embodiments may create and search for excerpted content on a computing machine, a network of computing machines, or a social networking system applying the principles as disclosed herein.

User Interface

Figure 9:
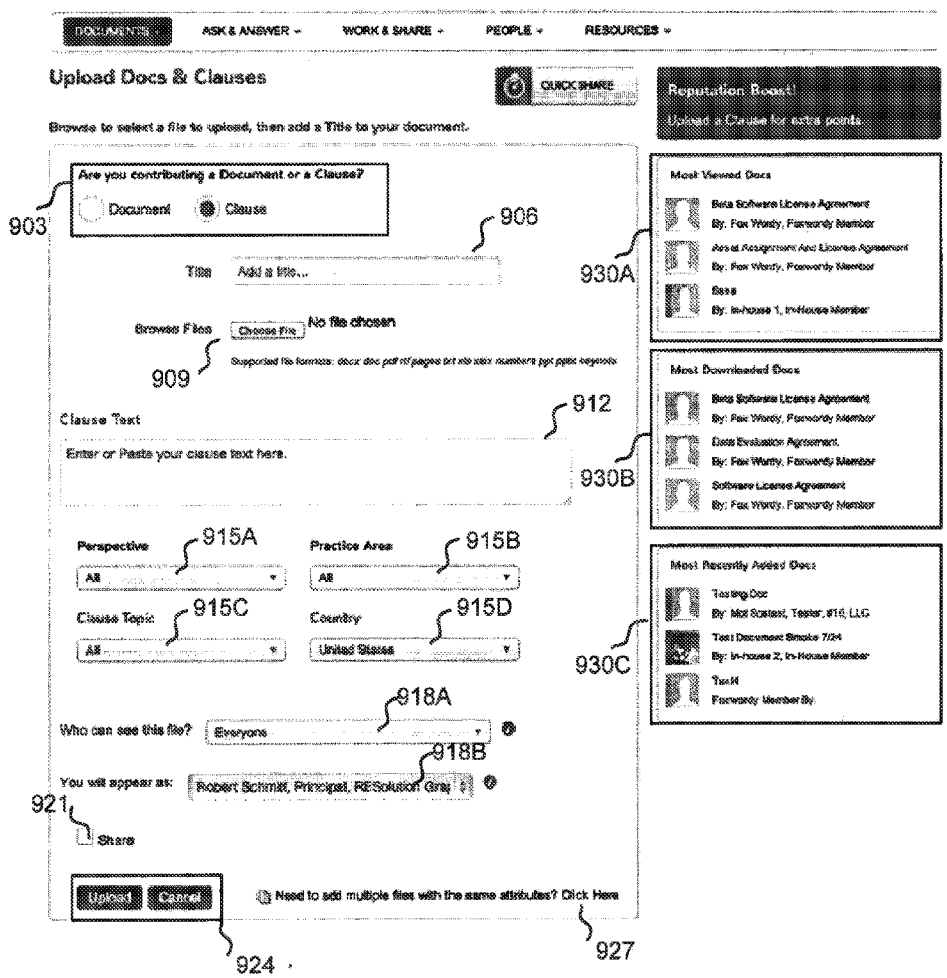
FIG. 9 illustrates an example user interface for uploading excerpted content.

Referring now to FIG. 9, illustrated is an example user interface for uploading excerpted content to the default network computing system. The uploading interface 900 contains a content type selection 903, a title box 906, a file upload button 909, a clause text box 912, attribute selections 915, privacy selections 918, a social network connecting option 921, form submission buttons 924, a batch upload option 927, and featured excerpted content boxes 930. The attribute selections 915 include a perspective selection 915A, a practice area selection 915B, a clause topic selection 915C, and a country selection 915D. The privacy selections 918 include a visibility selection 918A and an anonymity selection 918B. The featured excerpted content boxes 930 include a most viewed box 930A, a most downloaded box 930B, and a most recently added box 930C. Some of the data input fields may be used to fill the fields of the content store entry 400 corresponding to the created excerpted content item.

The content type selection 903 is used to specify if the excerpted content is a Document or a Clause. For example, a Clause may be a sentence to a paragraph, while a Document may be a longer text file having multiple paragraphs. The selected type may be recorded in the content type field 420. The title box 906 indicates the display title for the excerpted content in the user interface, such as in search results, user profile pages, user activity feeds, and suggested excerpted content links. The text entered in the title box 906 fills the content title field 404. The file upload button 909 is used to select a file for upload. The uploaded file may contain text for the content text field 406 and be analyzed to fill the content type field 420, metadata field 422, and file size field 424. The clause text box 912 is an alternate method to enter text for an excerpted content item. Text may be typed, copied and pasted, or dragged and dropped into the clause text box 912. Inputs to the clause text box 912 may fill the content text field 406.

The attribute selections 915 may be used to affiliate attributes with the content item. The attributes selected are used to create content attribute entries 600 for the excerpted content item. In an embodiment, content attribute entries 600 may be created using information (e.g., author location, author expertise, author occupation, author employer, or author account type) from the user profile of the user creating the excerpted content item. In an alternate embodiment, the country selection 915D may be replaced or supplemented by attribute selections 915 indicating more specific locations (e.g., state, city). The privacy selections 918 are used to create entries in the privacy store 340. The visibility selection 918A indicates which audience may view the excerpted content (e.g., everyone, user profiles with the same default network as the uploading user profile, user profiles connected to the uploading user profile, user profiles in particular groups the uploading user profile has joined, the uploading user's user profile). The anonymity selection 918B indicates what author information, if any, is associated with the created excerpted content entry. For example, the uploading user may elect non-anonymity (e.g., name, title, company, and location are visible), partial visibility (e.g., title and location are visible), or full anonymity (e.g., no personal information is visible).

The social network connecting option 921 may be selected to share the excerpted content item on another social network (e.g., LinkedIn, Facebook, Google Plus). The form submission buttons 924 may be selected to upload an excerpted content item, with the information entered in the uploading interface 900 or to cancel submission and discard the entered information. The batch, upload option 927 may be selected to upload multiple files to create one or more excerpted content items. The featured excerpted content boxes 930 suggest published excerpted content items for viewing by a user. For example, the most viewed box 930A lists excerpted content items with many views, the most downloaded box 930B lists the most excerpted content items with, many downloads, and the most, recently added box 930C lists recently published excerpted content. In an alternate embodiment, the featured excerpted content boxes 930 may contain implicit filtering based on a recent time period (e.g., the last day or week) and/or one or more attributes of a user profile (e.g., excerpted content from user profiles having the same account type and/or location is shown). In an embodiment, an interface similar to the uploading interface 900 could be used to modify excerpted content items that a user has published.

Figure 10:
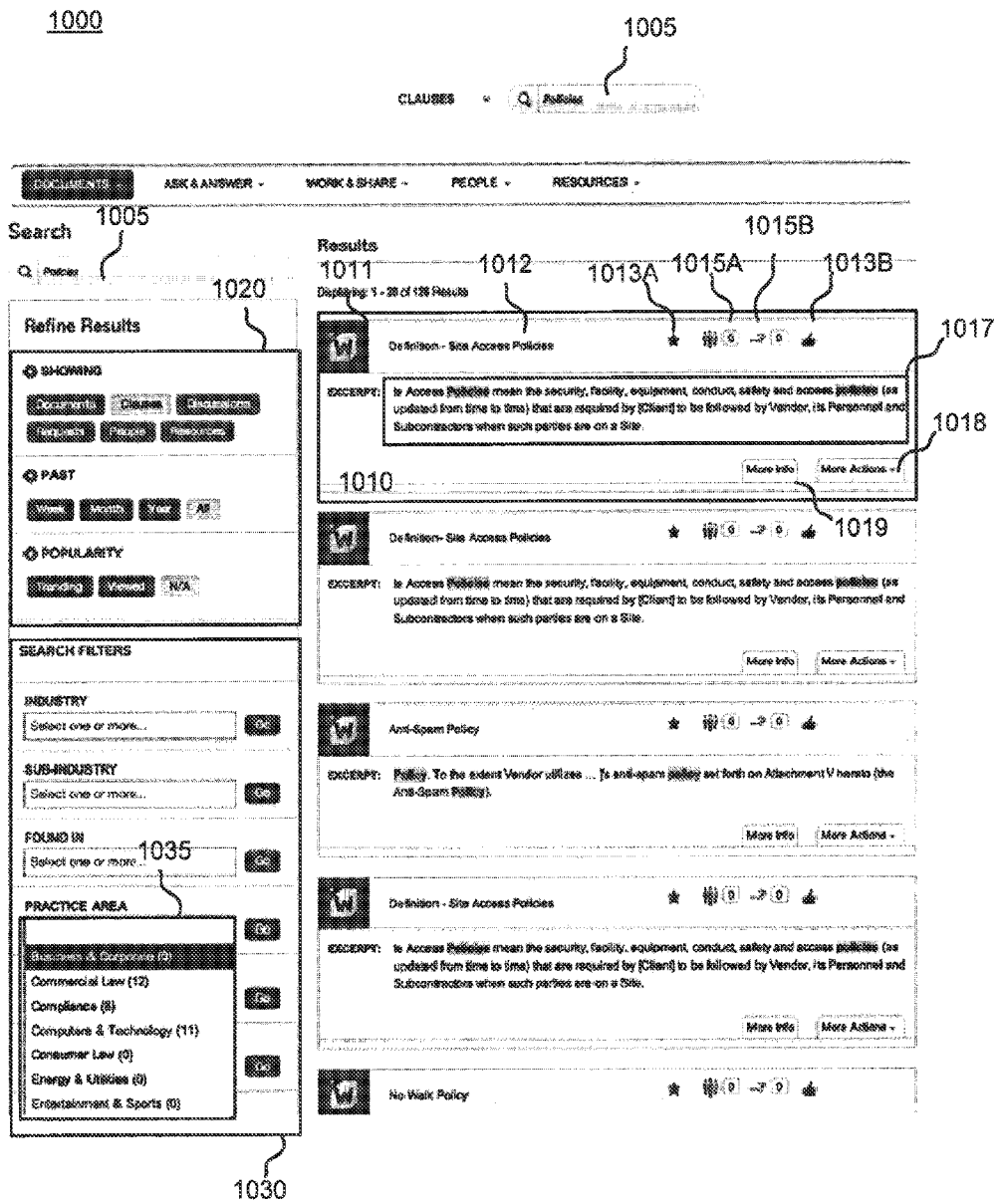
FIG. 10 illustrates an example user interface for searching published excerpted content.

Referring to FIG. 10, illustrated is an example user interface for searching for excerpted content published through the default network computing system. The content search interface 1000 includes a search term box 1005, one or more search results 1010, a refine search results box 1020, and an attribute filters box 1030. The one or more search results 1010 contain a file type icon 1011, a title 1012, user toggles 1013, user interaction counts 1015, a content excerpt 1017, an additional actions selector 1018, and an additional information link 1019. The user toggles 1013 include a favorite icon 1013A and a like icon 1013B. The user interaction counts 1015 include a social count 1015A and a view count 1015B. The attributes filters box 1030 includes one or more attribute options selectors 1035.

The search term box 1005 is used to enter a search term received 810 by the excerpted content search process 800. The one or more search results 1010 are selected 860 by the excerpted content search process 810 as top results for a given search term entered in the search term box 1005. A search result 1010 contains data from the content store entry 400 corresponding to the excerpted content item. Other data in search results 1010 may be retrieved from the interaction store 335. The file type icon 1011 corresponds to the program that created the source file for a Document. In an embodiment, a Clause has its own file type icon. In an embodiment, selecting the file type icon 1011 may prompt the user to download or save the corresponding excerpted content item. The file type icon is displayed based on the file type retrieved from the content type entry 420. The title 1012 is taken from the content title entry 404.

The favorite icon 1013A may be used by the user viewing the search results as a means to mark an excerpted content item as a favorite. Excerpted content items a user profile has marked as favorites may be viewed on a dedicated part of the default network user interface. The like icon 1013B may be used by a viewing user to indicate approval or a judgment that the excerpted content is useful or of high quality. When a user interacts with a user toggle 1013, a linked interest entry 500 may be created. The social count 1015A may indicate number of comments, likes, or favorites, for a search entry, including interactions by all user profiles, user profiles in the same default network as the viewing user profile, or user profiles connected to the viewing user profile.

The view count 1015A indicates the number of user profiles who have downloaded or viewed, through the default network user interface, the excerpted content item.

The view count may include all views, views by user profiles in the same default network as the viewing user profile, or views by user profiles connected to the viewing user. A content excerpt 1017 contains text from the content text field 406. In one embodiment, the text in the content excerpt 1017 is chosen according to text containing an instance of the search term. For example, the content excerpt 1017 may include text containing the first instance of the search term or text including the most occurrences of the search term. The additional actions selector 1018 may be used to view, download, save (e.g., to the client device 210 or to a cloud repository), share (e.g., by social networking post), send (e.g., by email), send within the default network user interface, or report for misuse the excerpted content item. The additional information link 1019 may access a user interface for viewing an excerpted content item, such as that illustrated in FIG. 11.

The refine search results box 1020 may be used to narrow search results. For example, a user may specify what types of content are displayed in the content search interface, including Documents, Clauses, discussions, requests, user profiles, or uploaded resources. As another example, a user may specify that search results were created and/or modified within the last week, month, or year. Other examples to refine search results include trending content (e.g., content that has received an increased amount of views and/or interactions recently) or highly-viewed content (e.g., views above a certain threshold). The attribute filters box 1030 contains one or more attributes that a user can specify to narrow search results. If an attribute is specified, then a document having a content attribute entry 600 with the corresponding attribute is displayed as a search result. Example attributes searchable within an embodiment include document type, author name, perspective, practice area, author location, author expertise, author occupation, author industry, author sub-industry, author employer, and author account type. An example attribute options selector 1035 is shown. Prompting a user to select from a limited number of options in an attribute category eliminates the problem of similar yet distinct attribute options.

Figure 11:
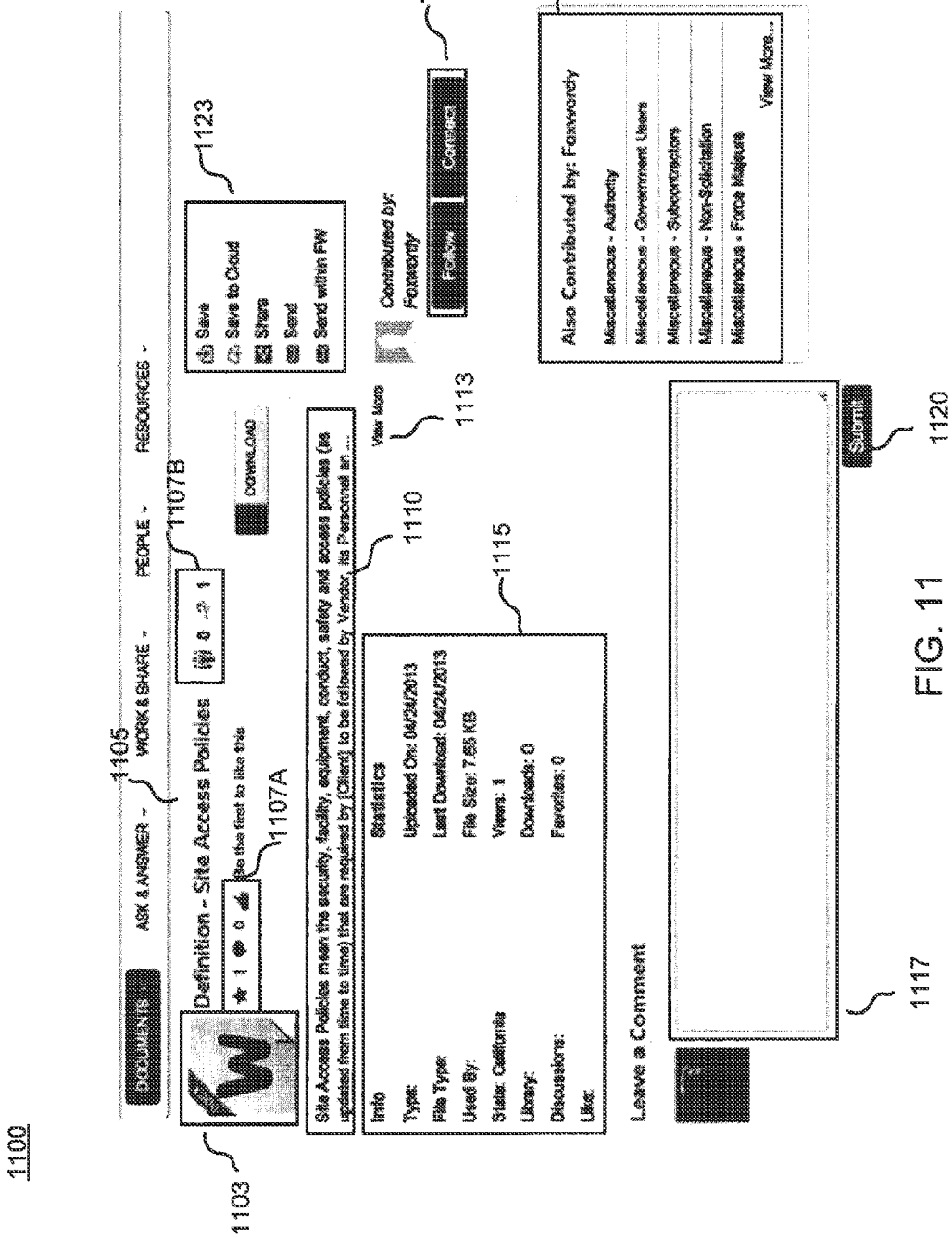
FIG. 11 illustrates an example user interface for viewing and commenting on published excerpted content.

Referring to FIG. 11, illustrated is an example user interface for viewing and commenting on excerpted content published through the default network computing system. The content viewing interface 1100 contains a file type icon 1103, a title 1105, social interaction icons 1107, a text excerpt 1110, an additional text button 1113, content data 1115, a comment text box 1117, a comment submission button 1120, action buttons 1123, author interaction buttons 1125, and an additional author content box 1127. The file type icon 1103 corresponds to the program that created the source file for a Document. In an embodiment, a Clause has its own file type icon. Selecting the file type icon 1103 may prompt the user to download or save the corresponding excerpted content item. The file type icon is displayed based on the file type retrieved from the content type entry 420. The title 1105 is taken from the content title entry 404.

The social interaction icons 1107 are used to interact with an excerpted content item and also summarize other user profiles' interactions with an excerpted content item. The social interaction icons can be used to like an excerpted content item or to mark it as a favorite. Other social interaction icons 1107 indicate the number of comments or views a content item has received by all user profiles as well as by user profiles in the viewing user profile's default network. The text excerpt 1110 displays a preview of the text in the content item. The text excerpt 1110 may be taken from the content text field 406. The additional text button 1113, when selected, displays additional text from the content text field 406. The content data 1115 indicates data about the excerpted content, including data from the time stored field 410, the content type field 420, the file size field 424, and the metadata field 422. Other information may indicate attributes such as location, retrieved from the content attribute store 325. Additional information may be retrieved from the interaction store 335 including total views, downloads, favorites, likes, discussions, and user profiles who have used the excerpted content.

The comment text box 1117 may be used by a user to enter text by typing, pasting copied text, or dragging and dropping text from another source. The comment submission button 1120 may send the text entered in the comment text box 1117 to the network server 230. The action buttons 1123 are used to save (e.g., to the client device 210 or to a cloud repository), share (e.g., by social networking post), and send (e.g., by email or within the default network user interface) the excerpted content item displayed by the content viewing interface 1100. The author interaction buttons 1125 are used to interact with the author. For example, a viewing user may choose to follow the author of the excerpted content and/or to invite the author to connect. The additional author content box 1127 presents additional excerpted content items that the author of the viewed excerpted content item has published and that have privacy settings allowing visibility to the viewing user profile. Privacy settings stored in the privacy store 340 may be retrieved to ensure correct excerpted content item visibility. When a user profile interacts with a social interaction icon 1107, selects the comment submission button 1120, selects an action button 1123, or an author interaction button, a linked interest entry 500 may be created in the linked interest store; additionally, an entry may be recorded in the interaction store 335.

Figure 12:
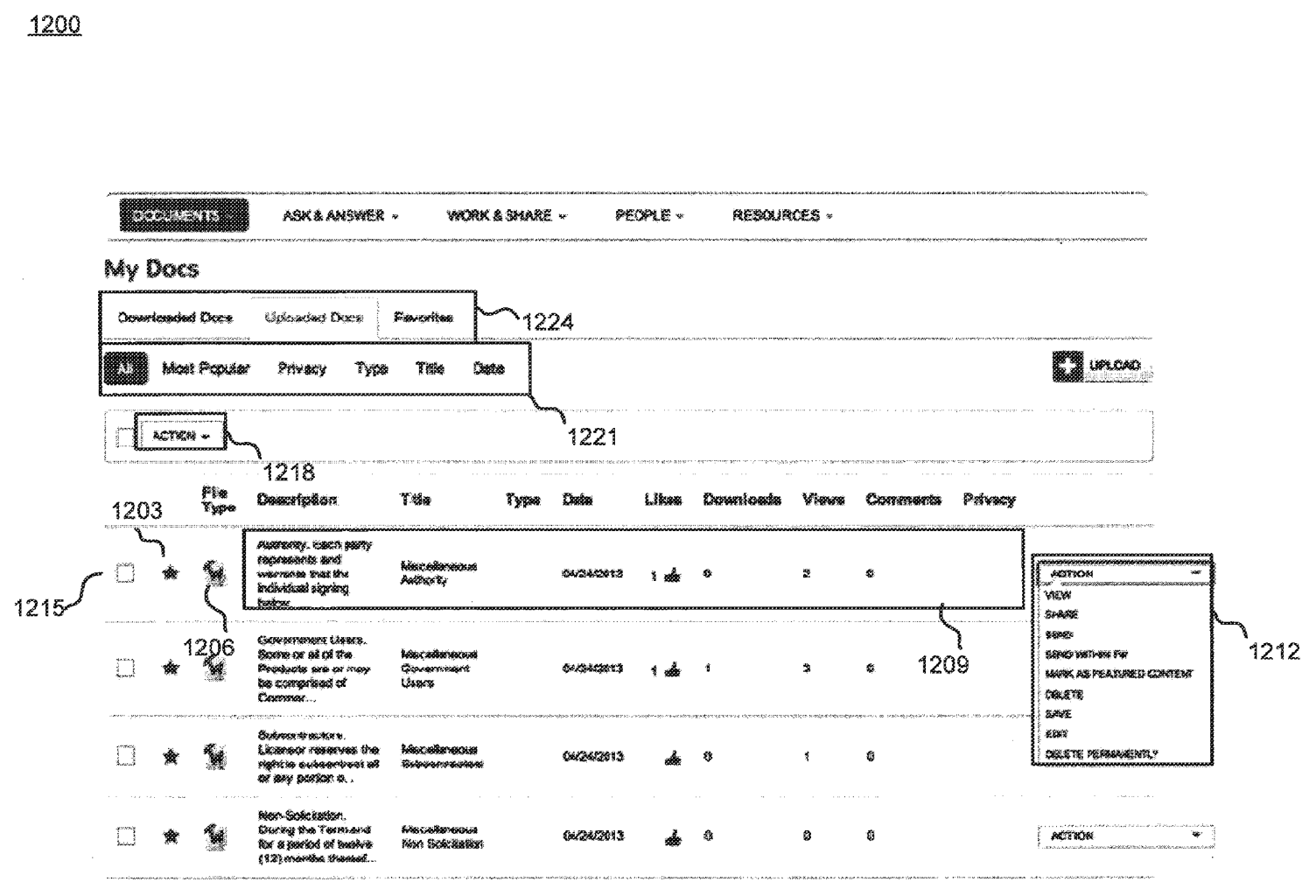

Referring to FIG. 12, illustrated is an example user interface for viewing and managing excerpted content uploaded by a user. For a displayed excerpted content item uploaded by the user, the content management interface 1200 includes a featured button 1203, a file type indication button 1206, content data 1209, an action menu 1212, and a content selector 1215. The content management interface 1200 further includes a batch action menu 1218, a content filter 1221, and a content category selector 1224.

The featured button 1203 may be selected by a user to mark the corresponding excerpted content item as a featured post, which may increase chances for display (e.g., on a user profile of the uploading user). Selecting the file type icon 1206 may prompt the user to download or save the corresponding excerpted content item. The file type icon is displayed based on the file type retrieved from the content type entry 420. The content data 1209 describes the excerpted content and includes a description, a title taken from the content title field 404, a content type indication pulled from the content type field 420, and a date from the time stored field 410 or time updated field 412. The description of an excerpted content item may be automatically generated from the title and/or an excerpt of the text in the excerpted content item. Also included in the content data 1209 are likes received, number of downloads, number of views, and number of comments, which may be retrieved from the interaction store 335, and a privacy setting indicator, which may be retrieved from the privacy store 340. A user may select an action to modify or interact with an excerpted content item using the action menu 1212. The action menu 1212 contains options for the viewer to view, share (e.g., through the default social network or another social network), send (e.g., through email or within the default social network), delete (i.e., remove from display to other user profiles), save, edit, or delete permanently (i.e., remove data associated with the excerpted content item) an excerpted content item.

An excerpted content item displayed in the content management interface may be selected with the content selector 1215. One or more excerpted content items selected with corresponding selectors 1215 may be modified using the batch action menu 1218. The batch action menu 1218 contains similar commands to the action menu 1212. The content filter 1221 may be used to select which excerpted content, items are listed (and/or the order of listing) in the content management interface 1200. For example, a user may filter to view the most popular of the user profile's uploaded excerpted content items, as determined through views, comments, favorites, likes, downloads, or a combination thereof. A user may also filter excerpted content items with the content filter 1221 to see excerpted content, items having a particular privacy setting or type. A user may additionally filter excerpted content according to a date range or an alphabetic range by title. The content, category selector 1224 may be used to change between categories of documents viewable through the content management interface 1200. The illustrated interface demonstrates the view when uploaded excerpted content is selected in the content category selector 1224. Other categories available for selection include downloaded documents and favorite documents (i.e., documents that a user profile has marked as favorites). Selecting the downloaded or favorite documents categories with the category content selector 1224 may display a similar interface indicating similar information for displayed excerpted content items, but the options available in the action menus 1212 and the batch action menu 1218 may be limited for documents that were uploaded by a different user profile than the user profile viewing the content management interface 1200.

Additional Considerations

The disclosed embodiments beneficially allow for efficiently uploading, viewing, sharing, and interacting with excerpted content items, for example, in a default network setting, a social network setting or other computing environment setting. For example, the use of default networks and connections as a means to suggest excerpted content items to users (e.g., through an activity feed, through a featured excerpted content box 930) increases the relevance of excerpted content items suggested to a viewing user. As a further example, the excerpted content search process enables efficient querying of excerpted content containing a desired search term, and the refine search results box 1020 and attribute filters box 1030 improve the user's capability to refine search results. The excerpted content creation process 700 beneficially allows for uniform processing of excerpted content from diverse sources into the content store 315 and the content attribute store 330. The excerpted content creation process enables the content search process 800 and the content search interface 1000. The privacy settings, including multiple options for visibility and anonymity, ensure that content is accessible in appropriate settings. The disclosed embodiments thus allow for default network users to find documents that are better tailored to a particular situation than more general publications available. When users like, comment, rate, and favorite excerpted content items, they provide an indication of quality to other users who may view an excerpted content item.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 1, 2, and 3. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 102, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for uploading and searching for excerpted content based on user attributes through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for finding excerpts of written content in a computing system, the method comprising:

receiving profile information from client devices associated with a plurality of user profiles associated with a plurality of account types, the profile information comprising a plurality of locations and a plurality of industry practice areas;

storing the profile information in user profile entries of the plurality of user profiles;

receiving, from a requesting user associated with a requesting user profile in a default network, one or more content attributes and a text search term;

retrieving an entry of the requesting user profile, the entry indicating a location, an account type, and an industry practice area of the requesting user profile;

identifying additional user profiles included in the default network, the additional user profiles having entries indicating a same location, same account type, and same industry practice area as the requesting user profile;

retrieving excerpted content items uploaded to the computing system from client devices associated with the additional user profiles, the retrieved excerpted content items each containing the search term text and each associated with the one or more content attributes;

identifying, through the computing system, occurrences of the received search term text in one or more fields in the retrieved excerpted content items;

generating, through the computing system, a score for each of the retrieved excerpted content items, each score representing a summation of a number of identified occurrences of the search term text in a field of the retrieved excerpted content item multiplied by a weight assigned to the field, wherein a field of the retrieved excerpted content item is one of a title, description, preview, content, file title, tags, content attributes, comments, and any combination thereof;

selecting excerpted content items from the retrieved excerpted content items according to the score for each of the retrieved excerpted content items;

providing, for display to the requesting user, search results comprising the selected excerpted content items, each selected excerpted content item displayed with a title, a content excerpt including text containing an occurrence of the search term text, a link to the excerpted content item, and a selector for additional actions with the excerpted content item;

receiving an input specifying an excerpted content item in the displayed search results;

providing, for display to the requesting user, the specified excerpted content item;

generating a linked interest entry reflecting an interaction between the requesting user and the specified excerpted content item, the linked interest entry comprising:
- a content key field that identifies the specified excerpted content item;
- a user identification field that identifies the user profile of the requesting user;
- an interest identification field that identifies the interaction between the requesting user and the specified excerpted content item; and
- a time created field that indicates when the linked interest entry was created;

updating an activity feed specific for the default network that describes at least one excerpted content item that was previously uploaded by an additional user profile of the default network within a threshold amount of time and at least one excerpted content item that was previously accessed by an additional user profile of the default network within the threshold amount of time; and prior to a passage of the threshold amount of time after receiving the input specifying the excerpted content item, providing, for display to one or more additional users in the default network, the updated activity feed that comprises an indication that the specified excerpted content item was accessed by the requesting user.

2. The computer-implemented method of claim 1, wherein the excerpted content items selected for display are selected from excerpted content items having highest rankings in a ranking of the retrieved excerpted content items according to the scoring.

3. The computer-implemented method of claim 1, wherein the received search term comprises one or more words, one or more phrases, and any combination thereof.

4. The computer-implemented method of claim 1, wherein each excerpted content item retrieved from the default network computing system is created from a method comprising:
- receiving an input from one of the client devices of the default network computing system, the input comprising one or more elements containing text;
- removing formatting, text file metadata, control characters, and characters specifying formatting from the received input;
- receiving, from the client device, one or more content attributes describing the received input;
- creating an excerpted content item, from the processed input and received one or more content attributes, on the default network computing system; and
- storing, on the default network computing system, the created excerpted content item for later retrieval by the default network computing system.

5. The computer-implemented method of claim 1, wherein the content attributes associated with the excerpted content item are selected from a group consisting of: document type, author name, author perspective, author practice area, author location, author expertise, author industry, author sub-industry, author occupation, author employer, author account type, and any combination thereof.

6. The computer-implemented method of claim 1, wherein retrieving the excerpted content items comprises:

identifying excerpted content items each containing the search term text and each associated with the one or more content attributes;

retrieving privacy settings of the identified excerpted content items received from uploading users of the identified excerpted content items, an excerpted content item's privacy settings indicating a group of user profiles allowed to access the excerpted content item; and filtering the identified excerpted content items to remove excerpted content items having privacy settings indicating groups of user profiles not including the requesting user profile.

7. The computer-implemented method of claim 6, wherein a privacy setting of one of the identified excerpted content items indicates the filtered excerpted content item may only be viewed by user profiles of a different default network comprising user profiles having at least one of a different location, a different account type, and a different industry practice area from the requesting user profile.

8. The method of claim 1, further comprising:
- identifying one or more suggested excerpted content items for the requesting user; and
- providing the one or more suggested excerpted content items for the requesting user,
wherein the identifying of the one or more suggested excerpted content items comprises accessing the linked interest entry reflecting the interaction between the requesting user and the specified excerpted content item.

9. The method of claim 8, wherein the one or more suggested excerpted content items are provided for the requesting user through the activity feed.

10. A computer-implemented method for finding excerpts of written content in a computing system, the method comprising:

receiving, from a requesting user associated with a requesting user profile, a text search term and one or more content attributes;

retrieving a location, an account type, and an industry practice area of the requesting user profile;

identifying additional user profiles included in the default network, the additional user profiles having entries indicating a same location, same account type, and same industry practice area as the requesting user profile;

retrieving excerpted content items uploaded from client devices associated with the additional user profiles, the retrieved excerpted content items each containing the search term text and associated with the one or more content attributes;

identifying occurrences of the received search term text in one or more fields in the retrieved excerpted content items;

generating, through the computing system, a score for each of the retrieved excerpted content items, each score representing a summation of a number of identified occurrences of the search term text in a field of the retrieved excerpted content item multiplied by a weight assigned to the field, wherein a field of the retrieved excerpted content item is one of a title, description, preview, content, file title, tags, content attributes, comments, and any combination thereof;

selecting excerpted content items from the retrieved excerpted content items according to the score for each of the retrieved excerpted content items;

providing, for display to the requesting user, search results comprising the selected excerpted content items, each selected excerpted content item displayed with a title, a content excerpt including text containing an occurrence of the search term text, a link to the excerpted content item, and a selector for additional actions with the excerpted content item;

generating a linked interest entry reflecting an interaction between the requesting user and the specified excerpted content item, the linked interest entry comprising:
  a content key field that identifies the specified excerpted content item;
  a user identification field that identifies the user profile of the requesting user;
  an interest identification field that identifies the interaction between the requesting user and the specified excerpted content item; and
  a time created field that indicates when the linked interest entry was created;

identifying one or more suggested excerpted content items for the requesting user by accessing the linked interest entry reflecting the interaction between the requesting user and the specified excerpted content item; and providing the one or more suggested excerpted content items for the requesting user, wherein the one or more suggested excerpted content items are provided for the requesting user through an activity feed.

11. The method of claim 10, wherein selecting the excerpted content items comprises selecting excerpted content items having high rankings in a ranking of the retrieved excerpted content items based on the identified occurrences of the search term text.

12. The method of claim 10, wherein each retrieved excerpted content item is created from a method comprising:
  receiving an input from one of the client devices, the input comprising one or more elements containing text;
  removing formatting, text file metadata, control characters, and characters specifying formatting from the received input;
  receiving, from the client device, one or more content attributes describing the received input;
  creating an excerpted content item from the processed input and the one or more content attributes; and
  storing the created excerpted content item.

13. A non-transitory computer-readable medium configured to store instructions, the instructions when executed by a processor cause the processor to:
  receive profile information from client devices associated with a plurality of user profiles associated with a plurality of account types, the profile information comprising a plurality of locations and a plurality of industry practice areas;
  receive, from a requesting user associated with a requesting user profile, a text search term and one or more content attributes;
  retrieve a location, an account type, and an industry practice area of the requesting user profile;
  identify additional user profiles included in the default network, the additional user profiles having entries indicating a same location, same account type, and same industry practice area as the requesting user profile;
  retrieve one or more excerpted content items uploaded from client devices associated with the additional user profiles, the retrieved excerpted content items each containing the search term text and associated with the one or more content attributes;
  identify one or more occurrences of the received search term in one or more fields in the one or more retrieved excerpted content items;
  generate, through the computing system, a score for each of the retrieved excerpted content items, each score representing a summation of a number of identified occurrences of the search term text in a field of the retrieved excerpted content item multiplied by a weight assigned to the field, wherein a field of the retrieved excerpted content item is one of a title, description, preview, content, file title, tags, content attributes, comments, and any combination thereof;
  select excerpted content items from the retrieved excerpted content items according to the score for each of the retrieved excerpted content items;
  provide, for display to the requesting user, search results comprising the selected excerpted content items, each selected excerpted content item displayed with a title, a content excerpt including text containing an occurrence of the search term text, a link to the excerpted content item, and a selector for additional actions with the excerpted content item;
  receive an input specifying an excerpted content item in the displayed search results;
  provide, for display to the requesting user, the specified excerpted content item;
  generate a linked interest entry reflecting an interaction between the requesting user and the specified excerpted content item, the linked interest entry comprising:
    a content key field that identifies the specified excerpted content item;
    a user identification field that identifies the user profile of the requesting user;
    an interest identification field that identifies the interaction between the requesting user and the specified excerpted content item; and
    a time created field that indicates when the linked interest entry was created;
  update an activity feed specific for the default network that describes at least one excerpted content item that was previously uploaded by an additional user profile of the default network within a threshold amount of time and at least one excerpted content item that was previously accessed by an additional user profile of the default network within the threshold amount of time; and
  prior to a passage of the threshold amount of time after receiving the input specifying the excerpted content item, provide, for display to one or more additional users in the default network, the updated activity feed that comprises an indication that the specified excerpted content item was accessed by the requesting user.

14. The computer-readable medium of claim 13, wherein the stored instructions that cause the processor to select the excerpted content items further comprises instructions that, when executed by the processor, causes the processor to select excerpted content items having high rankings in a ranking of the retrieved excerpted content items based on the identified occurrences of the search term text.

15. The computer-readable medium of claim 13, wherein the retrieved excerpted content item is created by instructions that cause the processor to:
  receive an input from one of the client devices, the input comprising one or more elements containing text;

remove formatting, text file metadata, control characters, and characters specifying formatting from the received input;
receiving, from the client device, one or more content attributes describing the received input;
create an excerpted content item from the processed input and one or more received attributes; and
store the created excerpted content item.

\* \* \* \* \*